(No Model.) 2 Sheets—Sheet 1.
R. D. ROBBINS.
LAWN MOWER.
No. 535,022. Patented Mar. 5, 1895.
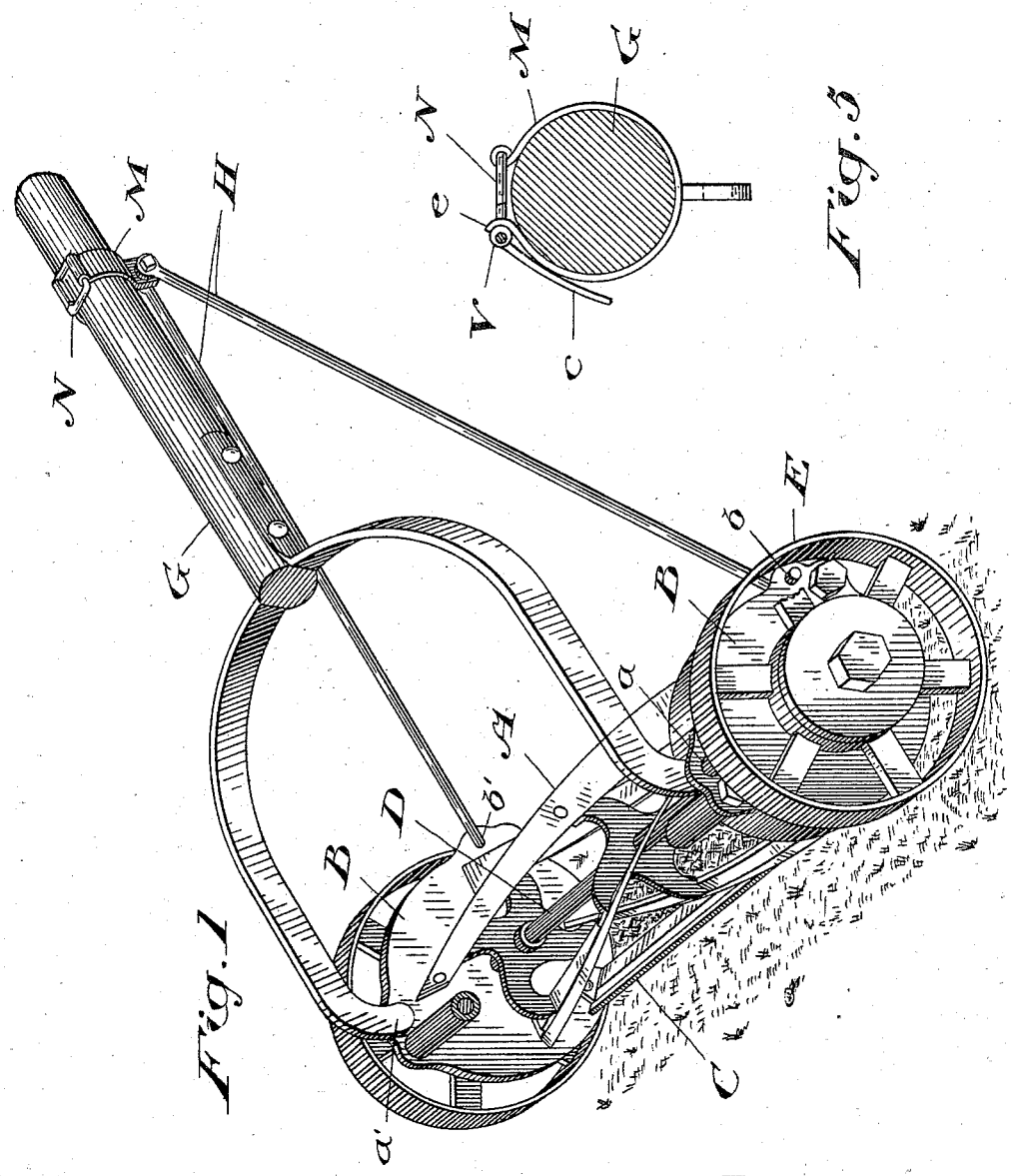
Witnesses
Fred Clarke
A. M. Neff
Inventor
Robert D. Robbins
by Ridout & Maybee
Attys (No Model.) 2 Sheets—Sheet 2.
R. D. ROBBINS.
LAWN MOWER.
No. 535,022. Patented Mar. 5, 1895.
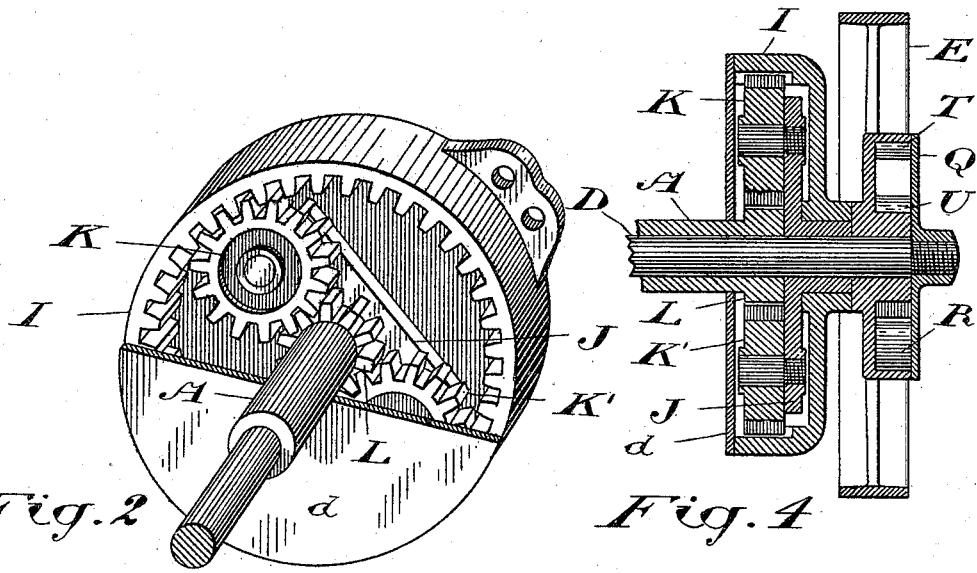
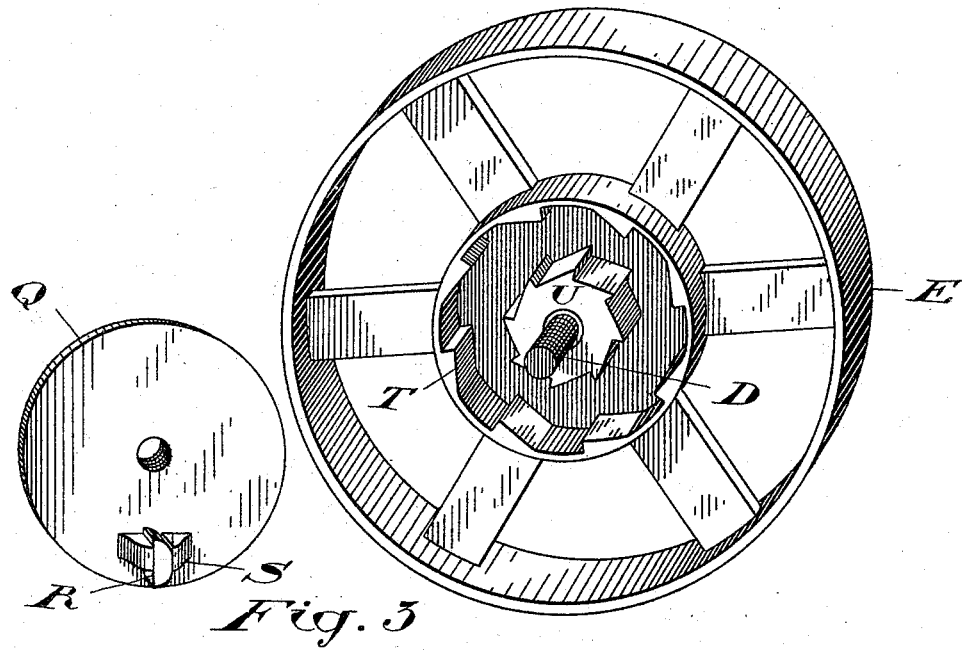
Witnesses
Fred Clarke
A. M. Neff
Inventor
Robert D. Robbins
by Ridout & Maybee
Attys

UNITED STATES PATENT OFFICE.

ROBERT D. ROBBINS, OF PORT PERRY, CANADA, ASSIGNOR TO JOHN DOBBIE, OF NIAGARA FALLS, NEW YORK.

LAWN-MOWER.

SPECIFICATION forming part of Letters Patent No. 535,022, dated March 5, 1895.

Application filed February 7, 1894. Serial No. 499,414. (No model.)

*To all whom it may concern:*

Be it known that I, ROBERT DAVID ROBBINS, gentleman, of the village of Port Perry, in the county of Ontario, in the Province of Ontario, Canada, have invented a certain new and Improved Lawn-Mower, of which the following is a specification.

The object of my invention is to devise a simple and effective lawn mower which shall be very light, shall be readily adjustable to trim the grass to any desired length and shall be capable of cutting close to any obstacle in front of it, and it consists, essentially, in journaling the rotary cutter and the frame supporting the throat piece or stationary knife on the shaft carrying the ground wheels, the said frame supporting the throat piece having adjustable connections to the handle so that the frame may be adjusted to raise or lower the throat piece, the whole being arranged in detail substantially as hereinafter more particularly explained.

Figure 1, is a perspective view of my improved lawn mower. Fig. 2, is an enlarged perspective detail of the gearing. Fig. 3, is an enlarged perspective view showing the clutch connection between the ground wheels and driving spindle, the clutch nut being removed and shown detached from the spindle. Fig. 4, is a longitudinal section of one end of the mower. Fig. 5, is an enlarged detail of the adjustable connection between the handle and the braces.

In the drawings, like letters of reference indicate corresponding parts in the different figures.

A, is the rotary cutter journaled on the spindle D. On this spindle is also journaled the frame B, carrying the throat piece or stationary knife C.

The spindle D, extends through the frame B, and has a clutch connection formed between it and the ground wheels E as hereinafter more particularly explained.

The bail of the handle G, is pivoted on the frame B, at $a, a'$. The braces H, are also pivoted at one end to the frame B at $b, b'$, and their other ends are adjustably connected with the handle, as hereinafter explained.

From this construction, it will be observed that by shifting the adjustable connection of the braces H, the frame B, may be rocked on the spindle D, so as to raise or lower the throat piece or stationary knife C, thus adjusting the cut of the mower so as to leave the grass of any desired length within the limit of motion of the throat piece or stationary knife C.

The adjustable connection between the braces H, and the handle $c$, comprises a spring band M, to which the braces H, are pivoted, a link N, pivoted at one end of the spring band M, and having an eccentric roller V, provided with a suitable handle, pivoted at its free end. A hook $e$ is formed at the other end of the spring band with which the eccentric roller may be engaged and the spring band clamped round the handle by revolving the eccentric roller by means of its handle $c$.

A certain degree of efficiency might be obtained if the rotary cutter were rigidly attached to the spindle D, but I prefer to use a gear connection between them for the purpose of increasing the speed of the rotary cutter. On reference to Figs. 2 and 4 this gearing will be readily understood.

I, is an internally geared disk forming part of the frame B.

J, is a cross-piece rigidly attached to the spindle D, on which two pinions K K' are journaled. These pinions mesh with the internally geared disk I, and also with a pinion L, formed on the hub of the rotary cutter A.

From this construction it will be seen that the rotary cutter will be revolved at a much greater speed than the spindle on which it revolves, but as it revolves in the same direction, the friction of the cutter is naturally much less than when it is revolving on a fixed spindle. One pinion K, would suffice, but by using two, the friction on the bearings of the spindle is equalized.

A cover $d$, is preferably placed over the open side of the disk I, to exclude dirt and retain the oil used in the lubrication of the gearing.

The ground wheels E, are placed on the outer ends of the spindle D, and are held thereon by a nut Q. This nut carries a dog R, sliding between two lugs S. When the nut is in position, this dog engages with the ratchet T, formed on the ground wheel E.

A second ratchet U is formed on the wheel

E, and the dog R is so proportioned that it must engage with either one or the other of the ratchets T and U, when the machine is moving forward, and when the machine is moving backward the dog will be given a reciprocating motion by the backs of the ratchet teeth.

I do not claim anything new in this style of clutch and any form of ratchet or dog may be substituted for those shown, but I do claim as new the nut Q, carrying a dog adapted to engage with the ratchet on the ground wheel, and at the same time serving to hold the said ground wheel on the spindle.

From the above description, it will be seen that I have invented a very simple, cheap and effective lawn mower which may be instantly adjusted to cut the grass at any desired length and may be worked close to any obstacle in front of the machine.

What I claim as my invention is—

1. In a lawn mower, the combination of the rotary knife A, carried by and deriving motion from the spindle F, of the ground wheels E; the frame B, journaled on the said spindle and carrying the throat piece or stationary knife C; the handle G, pivoted to the said frame; and the braces H, pivoted at one end to the frame B, and a spring band M adjustably and slidingly connecting the other ends of said braces to the said handle, substantially as and for the purpose specified.

2. In a lawn mower, an internally geared disk I, a spindle D journaled therein and deriving motion from the ground wheel E by means of clutch mechanism, a cross-piece J rigidly attached to said spindle D, a pinion K journaled on the said cross-piece and meshing with the internally-geared disk, in combination with the rotary knife A having a pinion L fast on its hub, which pinion meshes with the pinion K, substantially as and for the purpose specified.

3. In a lawn mower, the combination of an internally-geared disk I, forming part of the frame B, and carrying the throat piece or stationary knife C, a spindle D journaled therein, and deriving motion from the ground wheel E by means of clutch mechanism, a cross-piece J rigidly attached to said spindle D, a pinion K journaled on said cross-piece and meshing with said internally geared disk, a rotary knife A having a pinion L fast on its hub meshing with said pinion K, and a handle c connected to said frame B, substantially as and for the purpose specified.

4. In a lawn mower, the combination of an internally-geared disk I, forming part of the frame B, and carrying a throat piece or stationary knife C, a spindle D journaled in said disk I, and deriving motion from the ground wheel E by means of clutch mechanism, a cross-piece J, rigidly attached to said spindle D, a pinion K, journaled on said cross-piece and meshing with said internally geared disk, a rotary knife A, having a pinion L fast on its hub meshing with said pinion K, and a handle c, rigidly, but adjustably, connected to said frame B, substantially as and for the purpose specified.

5. In a lawn mower, the combination of the frame B, pivoted handle G, braces H, spring band M, pivoted link N, hook O, and pivoted eccentric P, substantially as and for the purpose specified.

6. In a lawn mower, the clip for connecting the braces to the handle, comprising the following elements:—the spring band M, pivoted link N, hook O, and pivoted eccentric P, substantially as and for the purpose specified.

Toronto, February 1, 1894.

ROBERT D. ROBBINS.

In presence of—
A. M. NEFF,
FRED CLARKE.